United States Patent
Tang et al.

(10) Patent No.: US 10,921,426 B2
(45) Date of Patent: Feb. 16, 2021

(54) CALIBRATION DEVICE OF ON-BOARD RADAR

(71) Applicant: AUTEL INTELLIGENT TECHNOLOGY CORP., LTD., Guangdong (CN)

(72) Inventors: Xinguang Tang, Guangdong (CN); Xiaolong Wang, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 0 days.

(21) Appl. No.: 17/012,903

(22) Filed: Sep. 4, 2020

(65) Prior Publication Data
US 2020/0400782 A1 Dec. 24, 2020

Related U.S. Application Data

(63) Continuation of application No. PCT/CN2019/077147, filed on Mar. 6, 2019.

(30) Foreign Application Priority Data

Mar. 7, 2018 (CN) .......................... 201810187748.5

(51) Int. Cl.
*G01S 7/40* (2006.01)

(52) U.S. Cl.
CPC .............. *G01S 7/4026* (2013.01); *G01S 7/40* (2013.01); *G01S 7/4017* (2013.01); *G01S 2007/403* (2013.01)

(58) Field of Classification Search
CPC ........ G01S 7/40; G01S 7/4008; G01S 7/4017; G01S 7/4021; G01S 7/4026;
(Continued)

(56) References Cited

U.S. PATENT DOCUMENTS 3,951,551 A * 4/1976 Macpherson ........ G01B 11/275
356/155
4,095,902 A * 6/1978 Florer .................. G01B 11/275
356/155
(Continued)

FOREIGN PATENT DOCUMENTS

CN 103091667 A 5/2013
CN 106405526 A 2/2017
(Continued)

OTHER PUBLICATIONS

International Search Report dated Jun. 4, 2019; PCT/CN2019/077147.

*Primary Examiner* — Peter M Bythrow

(57) ABSTRACT

The present application relates to the field of automobile maintenance and device calibration, and discloses an on-board radar calibration device. The on-board radar calibration device includes a bracket assembly, a beam assembly, a sliding member, and a calibration laser. The beam assembly is mounted on the bracket assembly, and is movable relative to the bracket assembly in a vertical direction. The sliding member is mounted on the beam assembly and is movable relative to the beam assembly in a horizontal direction, the sliding member including a first surface and a second surface opposite to each other and being provided with a mounting through hole, and the mounting through hole penetrating the first surface and the second surface. The calibration laser is accommodated in the mounting through hole and is configured to emit a laser beam toward a to-be-calibrated automobile. In the present application, the calibration laser can horizontally slide in synchronization with the sliding member, thereby facilitating positioning of radar calibration auxiliary devices of different automobile models to calibrate on-board radars of different automobile models.

15 Claims, 7 Drawing Sheets

(58) Field of Classification Search
CPC ....... G01S 2007/403; G01S 2007/4034; G01S 13/90; H01Q 1/12; G01C 15/00; G01C 9/00; G06F 15/00; G01M 17/007; G01M 17/00; B62D 65/00; G01B 11/26; G01B 5/25; G01B 11/275; G01B 11/27; G01B 11/2755; G01B 2210/12; B63B 49/00; G01P 21/00; A47B 96/06
See application file for complete search history.

(56) References Cited

U.S. PATENT DOCUMENTS

| | | | | |
|---|---|---|---|---|
| 4,134,680 A * | 1/1979 | Hunter | G01M 11/061 | 250/208.6 |
| 4,249,824 A * | 2/1981 | Wiederrich | G01B 11/2755 | 356/153 |
| 4,615,618 A * | 10/1986 | Bailey | G01B 11/2755 | 33/203.17 |
| 4,630,379 A * | 12/1986 | Wickmann | G01B 11/245 | 33/288 |
| 5,154,386 A * | 10/1992 | Heck | H01Q 1/18 | 248/218.4 |
| 5,505,000 A * | 4/1996 | Cooke | G01B 5/0002 | 33/286 |
| 5,782,003 A * | 7/1998 | Bozzo | G01C 15/004 | 33/291 |
| 6,031,508 A * | 2/2000 | Ishizuka | H01Q 1/125 | 343/878 |
| 6,480,172 B1 * | 11/2002 | Sawyer | H01Q 1/12 | 343/874 |
| 6,484,987 B2 * | 11/2002 | Weaver | F16M 11/10 | 248/278.1 |
| 6,498,959 B1 * | 12/2002 | January | G01B 11/00 | 33/227 |
| 6,809,806 B1 * | 10/2004 | Carnevale | G01B 11/272 | 342/167 |
| 7,062,861 B2 * | 6/2006 | O'Mahony | G01B 11/002 | 33/286 |
| 7,121,011 B2 * | 10/2006 | Murray | G01B 11/2755 | 33/288 |
| 7,337,650 B1 * | 3/2008 | Preston | B60W 40/11 | 73/1.38 |
| 7,376,492 B2 * | 5/2008 | Srack | G01B 5/0025 | 33/288 |
| 7,424,387 B1 * | 9/2008 | Gill | G01B 11/2755 | 702/150 |
| 7,685,725 B2 * | 3/2010 | Rodriguez | H01Q 1/1207 | 33/296 |
| 8,274,648 B2 * | 9/2012 | Corghi | G01B 11/2755 | 356/139.09 |
| 8,345,953 B2 * | 1/2013 | Stevens | G01B 11/03 | 382/154 |
| 8,538,724 B2 * | 9/2013 | Corghi | G01B 11/2755 | 702/150 |
| 8,794,578 B2 * | 8/2014 | Lin | H01Q 1/125 | 248/218.4 |
| 8,866,695 B2 * | 10/2014 | Renilson | H01Q 1/1228 | 343/882 |
| 8,998,155 B2 * | 4/2015 | Oh | F16B 35/06 | 248/214 |
| 9,065,172 B2 * | 6/2015 | Lewry | H01Q 1/1242 | |
| 9,170,101 B2 * | 10/2015 | Stieff | G01S 7/4026 | |
| 9,279,670 B2 * | 3/2016 | Schommer | G01B 11/27 | |
| 9,545,966 B2 * | 1/2017 | Kim | B62D 65/005 | |
| 9,645,051 B2 * | 5/2017 | Jin | G01M 17/007 | |
| 10,044,091 B2 * | 8/2018 | DiPiero | H01Q 1/1228 | |
| 10,323,936 B2 * | 6/2019 | Leikert | G01B 11/2755 | |
| 10,370,072 B1 * | 8/2019 | Grate | G01S 7/4813 | |
| 10,411,342 B2 * | 9/2019 | Nakamoto | H01Q 1/08 | |
| 10,418,683 B2 * | 9/2019 | Bensen | H01Q 1/1228 | |
| 2004/0017308 A1 * | 1/2004 | Kikuchi | H01Q 1/3233 | 342/74 |
| 2004/0039544 A1 * | 2/2004 | Merrill | G01B 11/275 | 702/147 |
| 2004/0165174 A1 * | 8/2004 | Knoedler | G01M 11/067 | 356/4.01 |
| 2005/0096807 A1 * | 5/2005 | Murray | G01S 7/4026 | 33/288 |
| 2011/0077900 A1 * | 3/2011 | Corghi | G01B 11/2755 | 702/150 |
| 2013/0325252 A1 * | 12/2013 | Schommer | G01S 7/52004 | 701/33.1 |
| 2014/0233023 A1 * | 8/2014 | Soininen | G01S 13/867 | 356/138 |
| 2015/0134191 A1 * | 5/2015 | Kim | G01M 17/007 | 701/29.7 |
| 2018/0052223 A1 * | 2/2018 | Stieff | G01B 11/14 | |
| 2019/0187249 A1 * | 6/2019 | Harmer | F16M 11/242 | |
| 2019/0249985 A1 * | 8/2019 | Stieff | G01S 7/4026 | |

FOREIGN PATENT DOCUMENTS

| | | |
|---|---|---|
| CN | 107449461 A | 12/2017 |
| CN | 107678004 A | 2/2018 |
| CN | 108318870 A | 7/2018 |
| WO | 2017/016541 A1 | 2/2017 |

* cited by examiner

CALIBRATION DEVICE OF ON-BOARD RADAR

The present application is a continuation of International Patent No. PCT/CN2019/077147 filed on Mar. 6, 2019, which claims priority to Chinese Patent Application No. 201810187748.5 filed on Mar. 7, 2018, both of which are incorporated herein by reference in their entireties.

BACKGROUND

Technical Field

The present application relates to the technical field of automobile maintenance and device calibration, and in particular, to an on-board radar calibration device.

Related Art

In the field of advanced driver assistant systems (ADAS), an adaptive cruise control (ACC) system is a commonly used auxiliary function. A specific working principle of the ACC system is that a distance between an automobile and a preceding automobile is measured in real time by using an on-board radar, a speed of the automobile is compared with that of the preceding automobile, and power systems such as an accelerator and a brake of the automobile are controlled, so that the automobile always maintains a constant safety distance from the preceding vehicle. Therefore, the on-board radar is crucial in implementation of an ACC function. In addition to measurement performance of the radar, accuracy and precession of data finally measured by the on-board radar depend on a mounting position and a mounting angle of the on-board radar. The mounting position and the mounting angle may change due to uncontrollable factors such as vibration and collision caused of the automobile. Therefore, in the field of automobile maintenance and device calibration, especially in calibration of the ACC function, calibration of the on-board radar is the core. At present, on-board radar calibration is after-market calibration, that is, after an automobile is delivered to a user for a period of time, an on-board radar needs to be calibrated for objective reasons.

Calibration of an on-board radar usually requires a radar calibration auxiliary device, and the radar calibration auxiliary device needs to be located based on different positions of the on-board radar in an automobile. The on-board radar is usually mounted at different positions on a front bumper of the automobile, resulting in different left-right positions and heights of on-board radars of different automobile models. This increases difficulty of locating the radar calibration auxiliary device and increases complexity of a radar calibration operation.

SUMMARY

In order to resolve the foregoing technical problem, embodiments of the present invention provide an on-board radar calibration device for facilitating a calibration operation.

The embodiments of the present invention adopt the following technical solution to resolve the technical problem.

An on-board radar calibration device is provided, including:

a bracket assembly; and a beam assembly mounted on the bracket assembly, the beam assembly being movable relative to the bracket assembly in a vertical direction;

a sliding member mounted on the beam assembly, the sliding member being movable relative to the beam assembly in a horizontal direction, the sliding member including a first surface and a second surface opposite to each other and being provided with a mounting through hole, and the mounting through hole penetrating the first surface and the second surface; and a calibration laser accommodated in the mounting through hole and configured to emit a laser beam toward a to-be-calibrated automobile.

Optionally, the on-board radar calibration device includes a radar calibration auxiliary device mounted on the sliding member, the radar calibration auxiliary device being movable relative to the beam assembly together with the sliding member in a horizontal direction, and the radar calibration auxiliary device including a through hole; and the calibration laser being configured to: after calibration of a vertical plane of the radar calibration auxiliary device is completed, emit the laser beam to pass through the through hole, to position the radar calibration auxiliary device.

Optionally, the on-board radar calibration device includes:

a laser configured to emit a laser beam to the radar calibration auxiliary device; and a diaphragm configured to control the laser beam emitted by the laser to pass through the diaphragm, the radar calibration auxiliary device being configured to reflect the laser beam passing through the diaphragm to return the reflected laser beam to the laser along an original path to calibrate the vertical plane of the radar calibration auxiliary device, so that the radar calibration auxiliary device is perpendicular to a central axis plane of the to-be-calibrated automobile.

Optionally, the diaphragm is provided with a strip diaphragm groove configured to control the laser beam emitted by the laser to pass through the strip diaphragm groove.

Optionally, the diaphragm includes a fixing base and a sliding diaphragm, the sliding diaphragm being provided with the strip diaphragm groove and being mounted on the fixing base to adjust positions of the sliding diaphragm and the fixing base.

Optionally, the fixing base includes a base, a fixing bracket and a locking handle, one end of the fixing bracket being mounted on the base, the fixing bracket being in a strip shape, and the locking handle being mounted on the fixing bracket; and the sliding diaphragm includes a diaphragm portion and a sliding groove portion, the diaphragm portion being in a panel shape and being provided with the strip diaphragm groove, the sliding groove portion being mounted on the diaphragm portion, being in a strip shape, being movably sleeved on the fixing bracket, and being provided with a strip slot, and the locking handle passing through the strip slot and being configured to fix the sliding diaphragm to the fixing base.

Optionally, the laser includes a transmitting portion, a mounting shaft and an observation target, the mounting shaft being mounted on the transmitting portion and being configured to mount the laser on a wheel hub of an automobile, and the observation target being mounted on the transmitting portion and including an observation target surface configured to display a position of the laser beam reflected by the radar calibration auxiliary device, and a middle portion of the observation target surface being provided with a transmitting hole.

Optionally, the beam assembly includes a guide rail, the guide rail being mounted on the bracket assembly, being horizontally disposed, and being movable relative to the bracket assembly in a vertical direction; and the sliding member is movably mounted on the guide rail and is horizontally slidable along the guide rail.

Optionally, the sliding member includes a plate and a holding member, the plate including the first surface and the second surface; and the holding member being fixedly mounted on the plate and being movably mounted on the guide rail, so that the sliding member is horizontally slidable along the guide rail.

Optionally, the beam assembly includes two guide rails, the two guide rails being respectively mounted on the bracket assembly and being disposed parallel to each other in a horizontal direction at an interval of a preset distance; and the sliding member includes four holding members, each of the holding members being provided with an accommodating channel, and the accommodating channel being horizontally disposed, where two accommodating channels of two holding members are arranged side by side along a first horizontal line, and two accommodating channels of the other two holding members are arranged side by side along a second horizontal line, one of the guide rails being sleeved on the two accommodating channels arranged side by side along the first horizontal line, and the other guide rail being sleeved on the other two accommodating channels arranged side by side along the second horizontal line.

Optionally, the bracket assembly includes a bracket body and a height adjustment member, at least three height adjustment members being mounted on a bottom surface of the bracket body and being configured to adjust an overall horizontal angle of the bracket body and a pitch angle of the bracket body.

Optionally, there are three height adjustment members, the three height adjustment members being distributed as an isosceles triangle and being configured to cooperatively adjust the overall horizontal angle of the bracket body, a height adjustment member at a vertex position of a vertex angle of the isosceles triangle being configured to adjust the pitch angle of the bracket body.

Optionally, the bracket assembly includes a base bracket and a pole bracket, one end of the pole bracket being connected to the base bracket, and the base bracket supporting the pole bracket;

the beam assembly is mounted on the pole bracket; and the base bracket includes a roller, the bracket body and the height adjustment member, at least three rollers being mounted on the bottom surface of the bracket body to facilitate movement of the base bracket.

Optionally, the pole bracket includes a lifting screw, the lifting screw being disposed in a vertical direction; and the beam assembly is sleeved on the lifting screw and is threadably fitted with the lifting screw, when the lifting screw rotates around a central axis of the lifting screw, the lifting screw driving the beam assembly to move along the lifting screw in a vertical direction.

Optionally, the pole bracket includes a lifting guide rail, the lifting guide rail including a vertical bar disposed in a vertical direction; and the beam assembly is movably mounted on the vertical bar, the vertical bar being configured to guide the beam assembly to move in a vertical direction.

Optionally, the lifting guide rail includes a horizontal bar mounted on the vertical bar in a horizontal direction; and one end of the lifting screw is mounted on the horizontal bar, and the other end of the lifting screw is mounted on the bracket body.

Optionally, the lifting guide rail includes a horizontal bar and a bottom bar;

two vertical bars are disposed in parallel in a vertical direction and are spaced apart by a preset distance;

the horizontal bar is disposed in a horizontal direction, and two ends of the horizontal bar are respectively mounted on the two vertical bars;

the bottom bar is fixedly mounted on the bracket body, and an end of each of the vertical bars away from the horizontal bar is fixedly mounted on the bottom bar; and one end of the lifting screw is fixedly mounted on the horizontal bar, and the other end of the lifting screw is fixedly mounted on the bottom bar.

Optionally, the pole bracket includes a height gauge, the height gauge being mounted on the vertical bar in a vertical direction and being configured to measure a moving distance of the beam assembly in a vertical direction.

Optionally, the beam assembly includes a support member and the guide rail;

the support member includes a support body and a movable block, the movable block being fixedly mounted on the support body and sleeved on the lifting screw, and being threadably fitted with the lifting screw; and the guide rail is fixedly mounted on the support body in a horizontal direction.

Optionally, the pole bracket includes a vertical bar disposed in a vertical direction; and the support member includes a sliding block, the sliding block being fixedly mounted on the support body, being movably mounted on the vertical bar, and being slidable along the vertical bar.

Optionally, two clamping portions respectively extend from two opposite sides of the support body, the two clamping portions being elongated, being disposed in a horizontal direction, and being spaced apart by a preset distance; and two guide rails are respectively mounted on the two clamping portions, are disposed in a horizontal direction, and are spaced apart by a preset distance.

Optionally, the beam assembly includes a level instrument configured to detect whether the guide rail is horizontally disposed.

In comparison with the prior art, the calibration laser is mounted on the second surface, and the calibration laser is partially accommodated in the mounting through hole, so that the calibration laser can horizontally slide in synchronization with the sliding member, thereby facilitating positioning of radar calibration auxiliary devices of different automobile models to calibrate on-board radars of different automobile models.

In addition, the calibration of the vertical plane of the radar calibration auxiliary device may be implemented by using the radar calibration auxiliary device, the diaphragm, and the laser. The radar calibration auxiliary device may be used for both the calibration of the vertical plane and positioning of the radar calibration auxiliary device. In this way, a quantity of elements of the radar calibration auxiliary device is reduced, costs are reduced, and a calibration operation is simplified.

BRIEF DESCRIPTION OF THE DRAWINGS

One or more embodiments are described by way of example with reference to the corresponding accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present invention, the present invention is described in further detail below with reference to the accompanying drawings and specific embodiments. It should be noted that an element described as being "fixed" to another element may be directly on the other element, or one or more intervening components may be present. An element described as being "connected" to another element may be directly connected to the other element, or one or more intervening components may be present. The terms "vertical", "horizontal", "left", "right", "inside", "outside", and similar expressions, as used in this specification, are for the purpose of description only.

Unless otherwise defined, all technical and scientific terms used herein have the same meaning as commonly understood by one of ordinary skill in the art to which the present invention belongs. In this specification, terms used in the specification of the present invention are merely intended to describe objectives of the specific embodiments, but are not intended to limit the present invention. As used herein, the term "and/or" includes any and all combinations of one or more related items listed.

In addition, the technical features provided in different embodiments of the present invention to be described below may be combined with each other as long as no conflict occurs.

Figure 1:
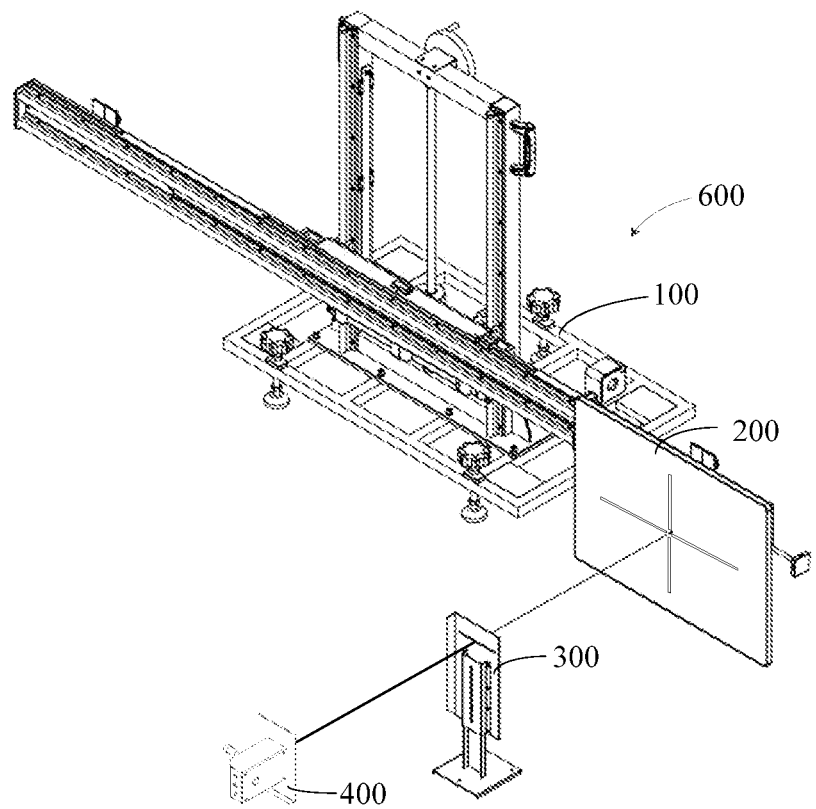
FIG. 1 is a three-dimensional view of an on-board radar calibration device according to an embodiment of the present invention.
Figure 5:
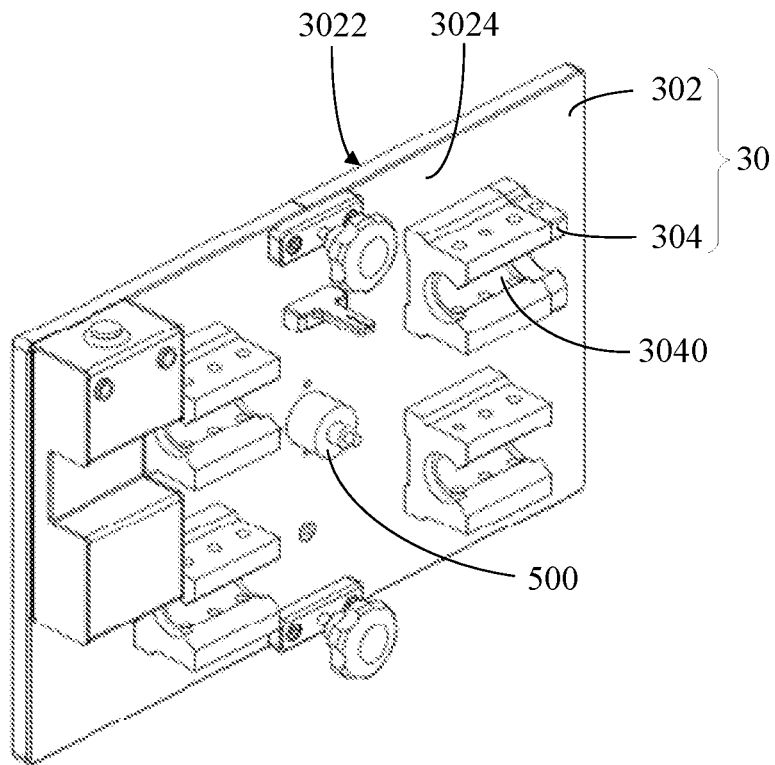
FIG. 5 is a three-dimensional view of a sliding member of the bracket apparatus in FIG. 2.

Referring to FIG. 1, an on-board radar calibration device 600 provided in an embodiment of the present invention includes a bracket apparatus 100, a radar calibration auxiliary device 200, and a calibration laser 500 (FIG. 5).

The radar calibration auxiliary device 200 may include a radar calibration device such as a radar calibration plate, a pattern plate, or a corner reflector. The radar calibration auxiliary device 200 may be mounted on the bracket apparatus 100, and the radar calibration auxiliary device 200 is positioned by using the bracket apparatus 100, so that the radar calibration auxiliary device can be used to align on-board radars of different types or different specifications, in order to perform auxiliary calibration on the on-board radars. The calibration laser 500 is mounted on the bracket apparatus 100 and is configured to emit a laser beam to position the radar calibration auxiliary device.

Optionally, the on-board radar calibration device may further include a diaphragm 300 and an on-board laser 400. The radar calibration auxiliary device 200 is mounted on the bracket apparatus 100 and is movable relative to the bracket apparatus 100 in a horizontal direction or a vertical direction. The bracket apparatus 100 is configured to support the radar calibration auxiliary device 200. The on-board laser 400 is configured to emit a laser beam, the diaphragm 300 is configured to control whether the laser beam passes through the diaphragm, and the radar calibration auxiliary device 200 is configured to reflect the laser beam passing through the stop 300 to return to the on-board laser 400 along an original path, to calibrate a vertical plane of the radar calibration auxiliary device 200.

Figure 2:
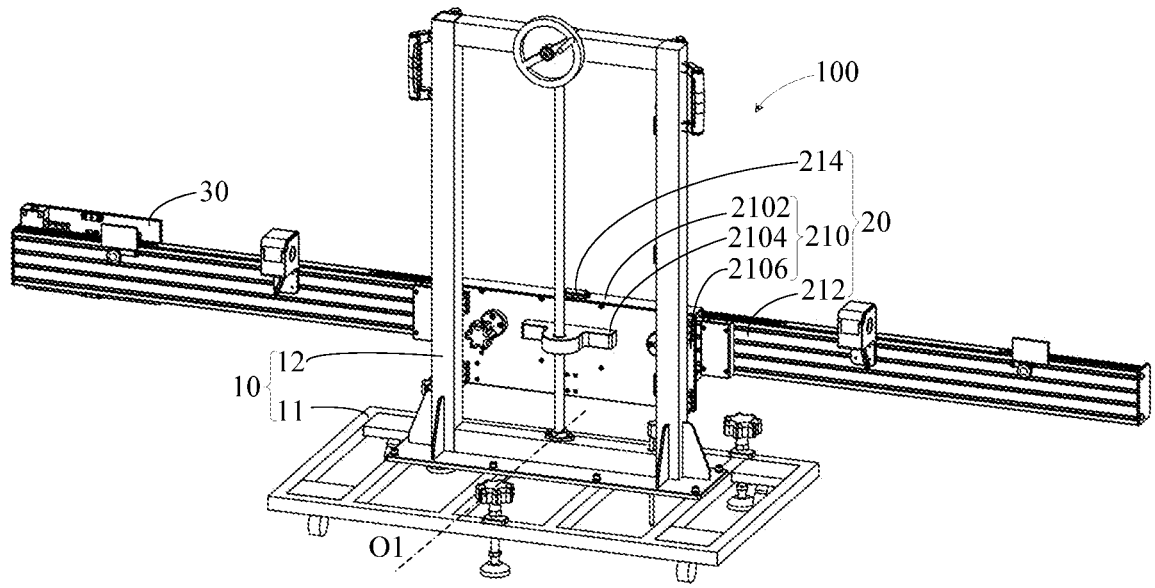
FIG. 2 is a three-dimensional view of a bracket apparatus of the calibration device in FIG. 1.

Referring to FIG. 2, the bracket apparatus 100 includes a bracket assembly 10, a beam assembly 20 and a sliding member 30. The beam assembly 20 is mounted on the bracket assembly 10 and is movable relative to the bracket assembly 10 in a vertical direction. The sliding member 30 is mounted on the beam assembly 20 and is movable relative to the beam assembly 20 in a horizontal direction. The radar calibration auxiliary device 200 is mounted on the sliding member 30 and is movable relative to the beam assembly 20 together with the sliding member 30 in a horizontal direction.

The bracket assembly 10 includes a base bracket 11 and a pole bracket 12, one end of the pole bracket 12 being connected to the base bracket 11, and the base bracket 11 supporting the pole bracket 12.

Figure 3:
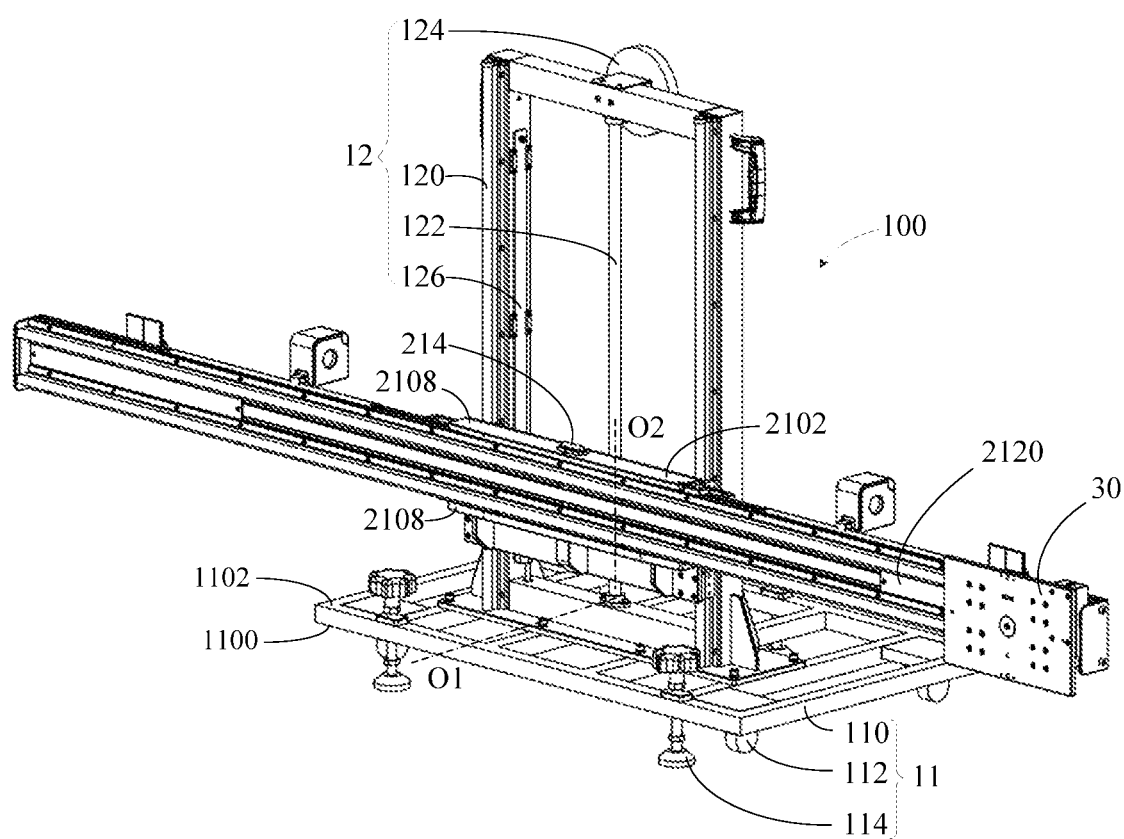
FIG. 3 is a three-dimensional view of the bracket apparatus in FIG. 2 from another angle.
Figure 4:
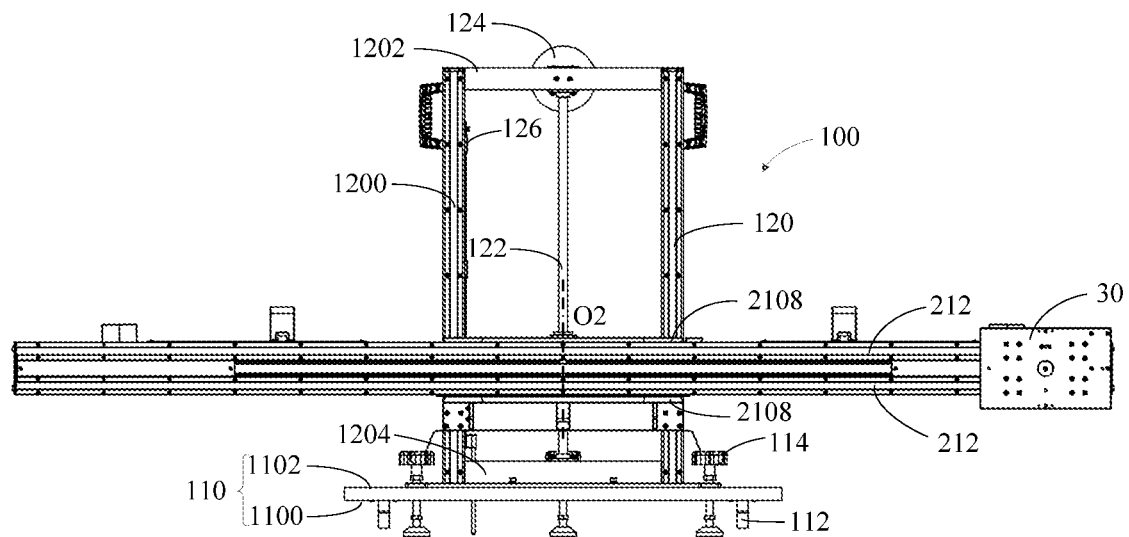
FIG. 4 is a front view of the bracket apparatus in FIG. 2.

Referring to FIG. 3 and FIG. 4, the base bracket 11 includes a bracket body 110, a roller 112 and a height adjustment member 114. The bracket body 110 is a rectangular panel made of a metal material. In order to reduce weight, a plurality of hollowed-out areas are formed. The bracket body 110 includes a bottom surface 1100 and an upper surface 1102 opposite to each other. The bracket body 110 has a central axis O1.

The roller 112 is mounted on the bottom surface 1100 to facilitate movement of the base bracket 11. In this embodiment, the roller 112 is a universal moving roller, so that the base bracket 11 can arbitrarily move frontward/rearward and leftward/rightward. There are four rollers 112, which are respectively mounted at four corners of the bracket body 110. It can be understood that, in some other embodiments, a shape of the bracket body 110 may change based on an actual requirement and is not limited to a rectangle. For example, the bracket body 110 may be circular. A quantity of the rollers 112 may be increased or decreased based on an actual requirement, provided that there are at least three rollers.

The height adjustment member 114 is mounted on the bottom surface 1100 and is configured to adjust a height of the bracket body 110. In this embodiment, the height adjustment member 114 is an adjustment handwheel, and there are three adjustment handwheels. The three adjustment handwheels 114 are distributed as an isosceles triangle. Two adjustment handwheels 114 located at a bottom edge of the isosceles triangle are disposed on one side of the bracket body 110 and are symmetrically disposed along the central axis O1 of the bracket body 110. Another adjustment handwheel 114 is disposed on the other side of the bracket body 110 and is disposed on the central axis O1 of the bracket body 110 (that is, at a vertex position of a vertex angle of the isosceles triangle). The three adjustment handwheels 114 may cooperatively adjust an overall horizontal angle of the bracket body 110, and the adjustment handwheel 114 on the central axis O1 of the bracket body 110 is adjusted alone to adjust a pitch angle of the bracket body 110.

It can be understood that the height adjustment member 114 may be other height adjustment apparatuses. A quantity of the height adjustment members 114 may be increased based on an actual requirement, provided that there are at least three height adjustment members, and the at least three height adjustment members 114 are disposed in the above-mentioned distribution manner.

The pole bracket 12 includes a lifting guide rail 120, a lifting screw 122, a lifting handle 124 and a height gauge 126.

The lifting guide rail 120 is mounted on the bracket body 110. The lifting guide rail 120 includes a vertical bar 1200, a horizontal bar 1202 and a bottom bar 1204. Two vertical bars 1200 are disposed in parallel in a vertical direction and are spaced apart by a preset distance, and are configured to guide the beam assembly 20 to move in a vertical direction. The horizontal bar 1202 is disposed in a horizontal direction, and two ends of the horizontal bar are respectively mounted on the two vertical bars 1200. The bottom bar 1204 is fixedly mounted on the bracket body 110, and an end of each of the vertical bars 1200 away from the horizontal bar 1202 is fixedly mounted on the bottom bar 1204.

It can be understood that, in some other embodiments, a quantity of the vertical bars 1200 may be increased or decreased based on an actual situation. For example, the quantity of the vertical bars 1200 may be one or three.

The lifting screw 122 is mounted on the lifting guide rail 120 in a vertical direction, one end of the lifting screw 122 being mounted on the horizontal bar 1202, and the other end of the lifting screw 122 being mounted on the bottom bar 1204.

It can be understood that, in some other embodiments, the bottom bar 1204 may be omitted, and an end of each of the vertical bars 1200 away from the horizontal bar 1202 is fixedly mounted on the bracket body 110. The lifting screw 122 is disposed in a vertical direction, one end of the lifting screw 122 being mounted on the horizontal bar 1202, and the other end of the lifting screw 122 being mounted on the bracket body 110.

The lifting handle 124 is mounted on the horizontal bar 1202 and is connected to the lifting screw 122 for rotation, to drive the lifting screw 122 to rotate around a central axis of the lifting screw. In this embodiment, a connecting rod of the lifting handle 124 is perpendicular to the lifting screw 122 and is connected to the lifting screw 122 through a gear structure. It can be understood that, in some other embodiments, the connecting rod of the lifting handle 124 may be coaxial with the lifting screw 122, and is directly connected to the lifting screw 122; or the lifting handle 124 may be replaced with other apparatuses for driving the lifting screw 122 to rotate, for example, a motor.

The height gauge 126 is mounted on the vertical bar 1200 in a vertical direction, and the height gauge 126 has a scale for measuring a moving distance of the beam assembly 20 in a vertical direction.

Referring again to FIG. 2 and FIG. 3, the beam assembly 20 includes a support member 210, a guide rail 212 and a level instrument 214. The support member 210 is mounted on the lifting guide rail 120. Under guidance of the lifting guide rail 120, the support member 210 is movable relative to the lifting guide rail 120 in a vertical direction. The guide rail 212 is fixedly mounted on the support member 210 and is movable relative to the lifting guide rail 120 together with the support member 210 in a vertical direction. The sliding member 30 is mounted on the guide rail 212 and is movable relative to the guide rail 212 in a horizontal direction.

The support member 210 includes a support body 2102, a movable block 2104 and a sliding block 2106.

The support body 2102 is substantially in a panel shape. Two clamping portions 2108 respectively extend from two opposite sides of the support body, the two clamping portions 2108 being elongated, being disposed in parallel in a horizontal direction, and being spaced apart by a preset distance.

The movable block 2104 being fixedly mounted on the support body 2102 and sleeved on the lifting screw 122. The movable block 2104 is threadedly fitted with the lifting screw 122. When the lifting screw 122 rotates around the central axis of the lifting screw, the movable block 2104 may be driven to move along the lifting screw 122 in a vertical direction, thereby driving the beam assembly 20 to move in a vertical direction. The movable block 2104 and the clamping portion 2108 are respectively located on two opposite sides of the support body 2102.

The sliding block 2106 is fixedly mounted on the support body 2102 and is located on a same side of the support body 2102 as the movable block 2104. At least one of the sliding blocks 2106 is correspondingly mounted on each of the vertical bars 1200, and each of the sliding blocks 2106 is movably mounted on a corresponding vertical bar 1200 and is slidable along the corresponding vertical bar 1200. In this embodiment, two of the sliding blocks 2106 are correspondingly mounted on each of the vertical bars 1200. It can be understood that, in some other embodiments, a quantity of the sliding blocks 2106 correspondingly mounted on each of the vertical bars 1200 may be increased or decreased based on an actual requirement, for example, decreased to one or increased to three.

Two guide rails 212 are respectively mounted on the two clamping portions 2108, and are disposed in parallel a horizontal direction at an interval of a preset distance. On two sides of the guide rail 212, there is a horizontal gauge 2120 using a center of the guide rail as a zero point and extending to the two sides, respectively. In other words, a scale value of the horizontal gauge 2120 uses the center of the guide rail 212 as the zero point, and gradually increases to the two sides of the guide rail 212, respectively, thereby facilitating positioning of the sliding member 30. A central axis O2 of the guide rail 212 and the central axis O1 of the bracket body 110 are located on a same vertical plane. It can be understood that, in some other embodiments, a quantity of the guide rails 212 may be increased or decreased based on an actual requirement, for example, reduced to one or increased to three. The guide rail 212 may be fixedly mounted on the support member 210 in any other proper manners. For example, the clamping portion 2108 is omitted, and the guide rail 212 is directly welded to the support body 2102.

The gradienter 214 is mounted on an upper side of one of the clamping portions 2108 and is configured to detect whether the clamping portion 2108 is horizontally disposed, to determine whether the guide rail 212 is horizontally disposed. It can be understood that, in some other embodiments, the level instrument 214 may be mounted on the guide rail 212 or on other parts of the beam assembly 20, provided that the level instrument can be used to detect whether the guide rail 212 is horizontally disposed.

The sliding member 30 is movably mounted on the guide rail 212 and can move along the guide rail 212 in a horizontal direction.

Figure 6:
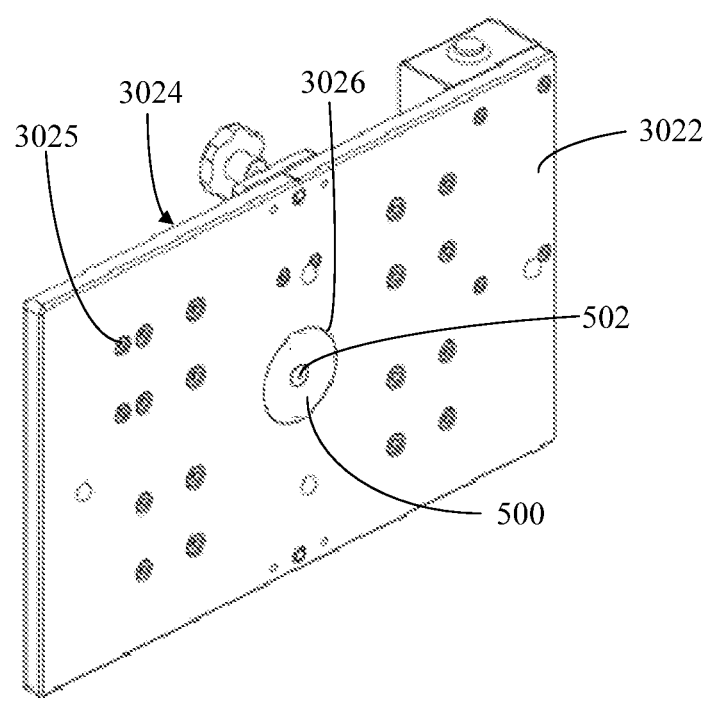
FIG. 6 is a three-dimensional view of the sliding member in FIG. 5 from another angle.

Referring to FIG. 5 and FIG. 6, the sliding member 30 includes a plate 302 and a holding member 304, the holding member 304 being fixed to the plate 302 and being movably mounted on the guide rail 212.

The plate 302 is a rectangular plate, and includes a first surface 3022 and a second surface 3024 opposite to each other. The first surface 3022 is used to face the on-board radar of the to-be-calibrated automobile, and the first surface 3022 is provided with a plurality of mounting points 3025 for mounting the radar calibration auxiliary device 200 or other calibration auxiliary devices. The plate 302 is provided with a mounting through hole 3026, the mounting through hole 3026 being located in the middle of the plate 302 and penetrating the first surface 3022 and the second surface 3024. The mounting through hole 3026 is used for mounting the calibration laser 500.

The holding member 304 is fixedly mounted on the second surface 3024, and there are four holding members 304. Each of the holding members 304 is provided with an accommodating channel 3040, the accommodating channel 3040 being horizontally disposed and being configured to accommodate the guide rail 212. Two accommodating channels 3040 of two holding members 304 are arranged side by side along a first horizontal line, and two accommodating channels 3040 of the other two holding members 304 are arranged side by side along a second horizontal line. One of the guide rails 212 is sleeved on the two accommodating channels 3040 arranged side by side along the first horizontal line, and the other guide rail 212 is sleeved on the other two accommodating channels 3040 arranged side by side along the second horizontal line, so that the sliding member 30 can horizontally slide along the guide rail 212 smoothly.

It can be understood that, in some other embodiments, a quantity of holding members 304 may be increased or decreased based on an actual requirement, provided that the quantity of holding members is at least equal to a quantity of guide rails 212. For example, there are two guide rails 212, and there are two holding members 304. One of the holding members 304 is sleeved on one of the guide rails 212, and the other holding member 304 is sleeved on the other guide rail 212. For another example, there is one guide rail 212, and there is one holding member 304. The holding member 304 is sleeved on the guide rail.

It can be understood that, in some other embodiments, the sliding member 30 can be movably mounted on the guide rail 212 in other manners, provided that the sliding member 30 can horizontally slide along the guide rail 212. For example, the guide rail 212 is provided with a guide groove disposed horizontally, and the sliding member 30 is provided with a sliding block, the sliding block being accommodated in the guide groove and being slidable along the guide groove.

It can be understood that, in some embodiments, a bracket may include other structures, provided that the structures can implement a position change of the radar calibration auxiliary device 200. In some brackets, the sliding member 30 can move only in a vertical direction. In some brackets, a height of the sliding member 30 is fixed and the sliding member can move only in a horizontal direction.

In this embodiment of the present application, a base or other structures of a bracket are not specifically limited, provided that the base or other structures can support the radar calibration auxiliary device 200. Further, the sliding member can adjust the position of the radar calibration auxiliary device 200.

In some embodiments, the calibration laser 500 is fixedly mounted on the second surface 3024, and the calibration laser 500 may be wholly or partially accommodated in the mounting through hole 3026 based on sizes of the mounting through hole 3026 and the calibration laser 500. The calibration laser 500 includes a laser emitting hole 502, the laser emitting hole 502 is exposed from the mounting through hole 3026 and a laser beam is emitted through the laser emitting hole 502 toward the on-board radar of the to-be-calibrated automobile. In some embodiments, the laser emitting hole 502 may be located at a center point of the sliding member 30, so that the laser beam emitted through the laser emitting hole can pass through the center point of the sliding member 30.

Figure 7:
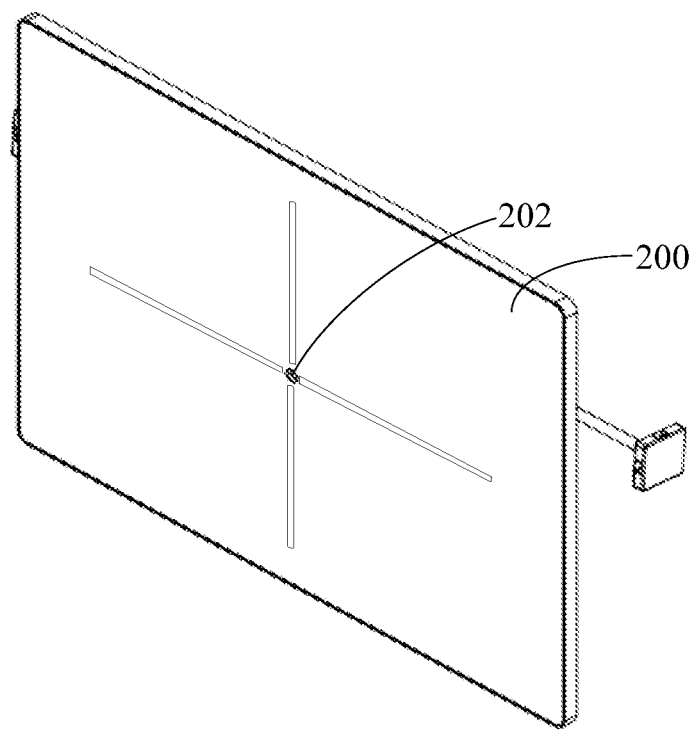
FIG. 7 is a three-dimensional view of a radar calibration auxiliary device of the calibration device in FIG. 1.

In some embodiments, the calibration laser 500 may be movably mounted in the sliding member 30. The position of the calibration laser 500 on the sliding member 30 can be adjusted based on a designated emission position. FIG. 7 shows a case in which a radar calibration auxiliary device is a radar calibration plate. The radar calibration auxiliary device 200 is in a rectangular panel shape and includes a light reflecting surface for reflecting the laser beam passing through the diaphragm 300 to the on-board laser 400. A middle portion of the radar calibration auxiliary device 200 has a through hole 202. The laser light emitted by from the laser emitting hole 502 passes through the through hole 202 to reach the to-be-calibrated on-board radar. The radar calibration auxiliary device 200 includes a substrate. One surface of the substrate is coated with a light reflecting material for reflecting the laser beam passing through the diaphragm 300 to the on-board laser 400. For example, the surface of the substrate is coated with a silver material. The substrate may be made of a lightweight material such as a plastic material or a lightweight metal material such as an aluminum alloy or a magnesium alloy. It can be understood that, in some other embodiments, the substrate may be made of a material capable of reflecting light, without a need to coat a light reflecting material.

It can be understood that the foregoing case is merely a specific application scenario of a radar calibration auxiliary device. The radar calibration auxiliary device only needs to reflect a radar wave to calibrate the on-board radar. Other additional functions of the radar calibration auxiliary device are not limited in this embodiment of the present application.

The radar calibration auxiliary device 200 may be mounted on the sliding member 30, and can move along with the sliding member 30. The radar calibration auxiliary device 200 may be mounted on the sliding member 30 after the sliding member 30 is positioned by using the calibration laser 500. In this case, the radar calibration auxiliary device 200 may not need to be provided with the through hole. Alternatively, the radar calibration auxiliary device may be mounted on the sliding member 30 before a position of the bracket is adjusted relative to the on-board radar. In this case, the radar calibration auxiliary device 200 may be provided with the through hole to allow the calibration laser 500 to emit the laser beam.

A manner of connecting the radar calibration auxiliary device 200 to the sliding member 30 only needs to satisfy that the radar calibration auxiliary device 200 can move with the sliding member 30, and a specific implementation structure thereof is not limited.

The radar calibration auxiliary device 200 or the sliding member 30 may be positioned in two manners.

In a first manner, the calibration laser 500 emits a laser beam to the on-board radar of the to-be-calibrated automobile, to implement positioning of the radar calibration auxiliary device 200. For example, the calibration laser 500 emits the laser beam onto the on-board radar, and the laser beam may be sent to a preset position on a surface of the on-board radar facing the bracket apparatus 100. Alternatively, the laser beam is sent to other positions that can be aimed at the on-board radar. This is not limited herein. For example, the calibration laser 500 is located at a central portion of the sliding member 30, and the laser beam emitted by the calibration laser passes through the center point of the sliding member 30. A height of the beam assembly and a horizontal position of the sliding member relative to the beam assembly are adjusted, so that the emitted laser beam falls on a center point of the above-mentioned surface of the on-board radar, that is, positioning of the radar calibration auxiliary device 200 is implemented. The radar calibration auxiliary device is aligned with the on-board radar, to further implement algorithm or software calibration on the on-board radar through the radar calibration auxiliary device 200.

Further, an auxiliary positioning apparatus may be used, so that positioning of the radar calibration auxiliary device 200 is more accurate. The auxiliary positioning apparatus can guide the laser beam to fall on the on-board radar, so that the laser beam can accurately reach a preset position on the on-board radar, such as the above-mentioned center point. In some embodiments, the auxiliary positioning apparatus may be a part of the on-board radar. The auxiliary positioning apparatus does not affect radar wave transmission of the on-board radar, and can indicate the preset position of the on-board radar during calibration. In some other embodiments, the auxiliary positioning apparatus is detachably mounted on the on-board radar. When the radar calibration auxiliary device 200 needs to be positioned, the auxiliary positioning apparatus covers a surface of the on-board radar facing the bracket apparatus, and an identifier of the preset position such as a gauge, a marking point or a through hole may be provided on the auxiliary positioning apparatus, so that the laser beam can exactly fall on the identifier of the preset position. After positioning of the radar calibration auxiliary device 200 is completed, the auxiliary positioning apparatus may be removed, and then the on-board radar may be calibrated by using the positioned radar calibration auxiliary device 200.

In a second manner, the calibration laser 500 sends a laser beam to the on-board radar, and the on-board radar may reflect the laser beam using a reflector of the on-board radar or a reflector that is additionally configured, so that the laser beam is reflected back to a preset position of the sliding member 30, thereby implementing positioning of the radar calibration auxiliary device 200. For example, the position of the radar calibration auxiliary device 200 may be adjusted by using the beam assembly and the sliding member, so that the reflected laser beam falls back to an emission point of the calibration laser 500, thereby implementing positioning of the radar calibration auxiliary device 200.

In the foregoing two manners, during adjustment of the position of the radar calibration auxiliary device 200, a difference between the position on which the laser beam falls and the preset position may be determined, and an operator is prompted based on the difference.

Figure 8:
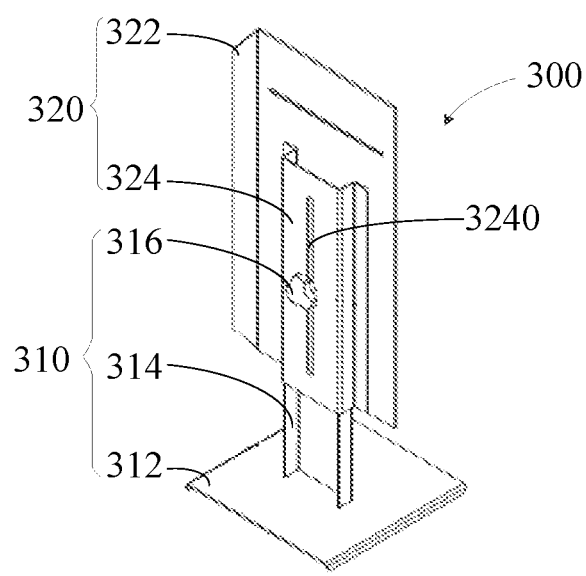
FIG. 8 is a three-dimensional view of a diaphragm of the calibration device in FIG. 1.
Figure 9:
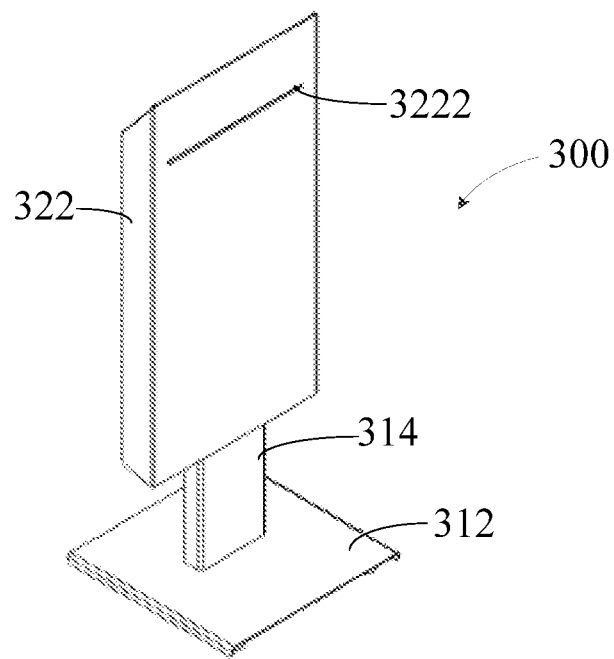
FIG. 9 is a three-dimensional view of the diaphragm in FIG. 8 from another angle.

Further, before the position of the radar calibration auxiliary device 200 is adjusted, a position of the bracket apparatus 100 may be orientated first. For example, a distance of the bracket apparatus 100 from a vehicle is adjusted so that the bracket apparatus 100 is placed in front of the vehicle in parallel, and a pitch angle of the bracket apparatus 100 is adjusted. The manner of adjusting the bracket described in the embodiments of the present application is merely an example, and any adjustment manner of the bracket shall fall within the scope of the embodiments of the present application. For example, when the radar calibration auxiliary device 200 is a device whose pitch angle is limited by a radar calibration plate or the like, the position of the radar calibration auxiliary device 200 may be adjusted after the pitch angle of the radar calibration auxiliary device 200 is adjusted. Alternatively, the position of the radar calibration auxiliary device 200 is adjusted first, and then the pitch angle of the radar calibration auxiliary device 200 is adjusted. This is not limited herein. Referring to FIG. 8 and FIG. 9, the diaphragm 300 includes a fixing base 310 and a sliding diaphragm 320.

The fixing base 310 includes a base 312, a fixing bracket 314 and a locking handle 316. The base 312 is a rectangular panel, one end of the fixing bracket 314 is mounted on a middle portion of the base 312, and the fixing bracket 314 is perpendicular to the base 312. The fixing bracket 314 is in a strip shape. The locking handle 316 is mounted on the fixing bracket 314.

The sliding stop 320 includes a diaphragm portion 322 and a sliding groove portion 324. The diaphragm portion 322 is substantially in a panel shape, and is provided with a strip diaphragm groove 3222 configured to allow a laser beam to pass through. A width of the diaphragm groove 3222 is slightly smaller than a diameter of a laser spot emitted by the on-board laser 400, so as to detect whether the laser beam exactly passes through the diaphragm groove 3222. The sliding groove portion 324 is mounted on the diaphragm portion 322, and is in a strip shape and is sleeved on the fixing bracket 314. The sliding groove portion 324 is slidable relative to the fixing bracket 314. The sliding groove portion 324 is provided with a strip slot 3240, and the locking handle 316 passes through the slot 3240 and is configured to stably fix the sliding diaphragm 320 to the fixing base 310.

Figure 10:
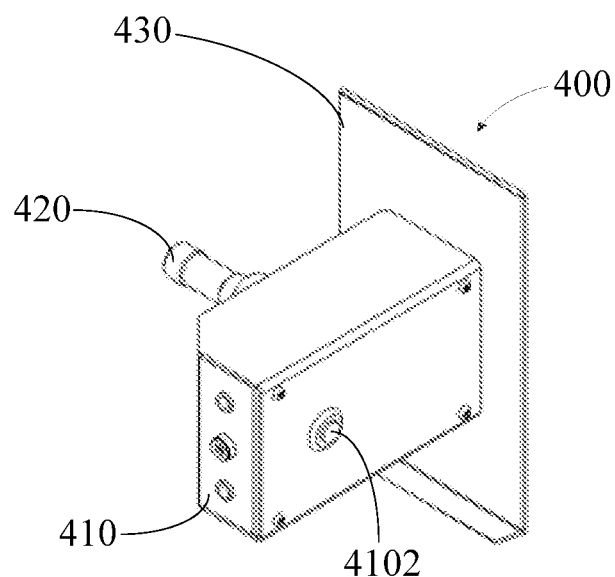
FIG. 10 is a three-dimensional view of a laser of the calibration device in FIG. 1.
Figure 11:
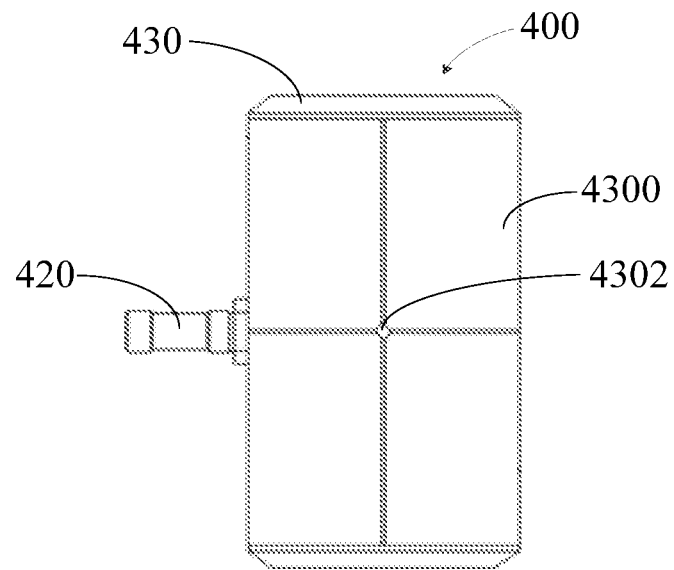
FIG. 11 is a three-dimensional view of the laser in FIG. 10 from another angle.

Referring to FIG. 10 and FIG. 11, the on-board laser 400 is a hub laser, including a transmitting portion 410, a mounting shaft 420 and an observation target 430. The transmitting portion 410 is configured to emit a laser beam and includes a switch 4102 configured to enable or disable the transmitting portion 410. The mounting shaft 420 is mounted on the transmitting portion 410 and is configured to mount the hub on-board laser 400 on a wheel hub of an automobile. The observation target 430 is mounted on the transmitting portion 410. The observation target 430 is a rectangular panel and includes an observation target surface 4300 configured to display a position of a laser beam reflected by the radar calibration auxiliary device 200. A middle portion of the observation target surface 4300 is provided with a transmitting hole 4302 configured to allow the laser beam to be emitted.

Figure 12:
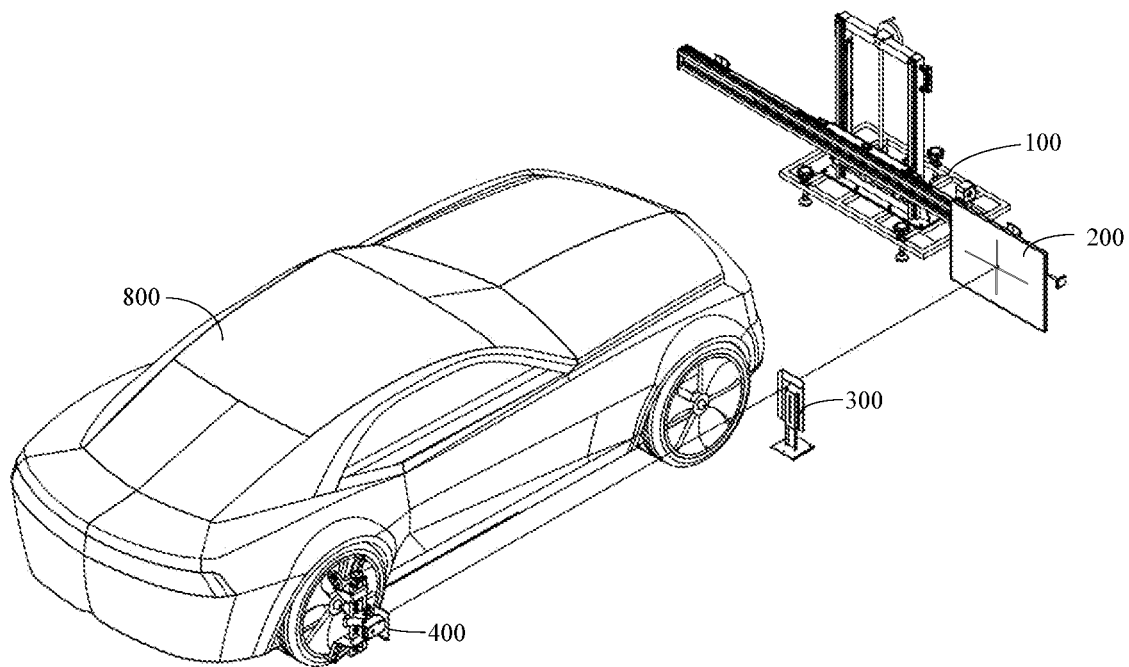
FIG. 12 is a schematic diagram of one step of calibrating an on-board radar by the calibration device in FIG. 1.

Referring to FIG. 12, in the first step of calibrating the on-board radar of the to-be-calibrated automobile, the automobile 800 is horizontally disposed (that is, the automobile 800 is parked on a horizontal plane), and the bracket apparatus 100 is moved to the front of the to-be-calibrated automobile 800 through the roller 112 with a distance of about 1 meter, so that the guide rail 212 is substantially parallel to an axle of the automobile 800. The level instrument 214 is observed and the height adjustment member 114 is adjusted, so that the guide rail 212 is horizontally disposed. The radar calibration auxiliary device 200 is mounted on the sliding member 30. In this case, the radar calibration auxiliary device 200 is parallel to the plate 302, and the laser emitting hole 502 is aligned with the through hole 202. The radar calibration auxiliary device 200 and the sliding member 30 move along the guide rail 212 to a side of the to-be-calibrated automobile 800. A wheel clamp is mounted on one rear wheel of the to-be-calibrated automobile 800, and the on-board laser 400 is mounted. The on-board laser 400 is turned on, so that the laser beam emitted by the on-board laser 400 is irradiated on the light reflecting surface of the radar calibration auxiliary device 200. The diaphragm 300 is taken and placed at a middle position between the on-board laser 400 and the radar calibration auxiliary device 200, and the diaphragm portion 322 is perpendicular to the laser beam. A height of the diaphragm groove 3222 is adjusted to be consistent with that of the transmitting hole 4302 of the on-board laser 400. An emission angle of the on-board laser 400 is adjusted so that the on-board laser 400 emits a laser beam in a horizontal direction. In addition, the laser beam emitted by the on-board laser 400 is parallel to the central axis plane of the to-be-calibrated automobile 800, and the position of the diaphragm 300 is properly moved so that the laser beam can exactly pass through the middle of the diaphragm groove 3222. Based on an actual situation, the sliding member 30 is slid and/or the height of the guide rail 212 is adjusted, so that the position of the radar calibration auxiliary device 200 is adjusted, and the laser beam in this case can be irradiated to the radar calibration auxiliary device 200. A position of the reflected laser point is observed, the bracket apparatus 100 is moved, and the height adjustment member 114 is adjusted, so that the laser beam reflected by the radar calibration auxiliary device 200 can be exactly returned along the original path to be projected to the transmitting hole 4302 of the on-board laser 400. In this case, the calibration of the vertical plane of the radar calibration auxiliary device 200 is completed, the guide rail 212 is perpendicular to the central axis plane of the automobile 800, and the radar calibration auxiliary device 200 and the plate 302 are vertically disposed and are also perpendicular to the central axis plane of the automobile 800.

In this embodiment, when the automobile 800 is horizontally disposed, the central axis plane of the automobile 800 is vertically disposed, and the automobile 800 is symmetrical relative to the central axis plane.

In the second step of calibrating the on-board radar, the calibration laser 500 is turned on, and the laser beam emitted from the laser emitting hole 502 passes through the through hole 202 of the radar calibration auxiliary device 200. The height of the guide rail 212 is adjusted and the sliding member 30 is horizontally slid, so that the laser beam emitted from the laser emitting hole 502 is irradiated in the middle of a surface of the on-board radar. The calibration laser 500 is turned off. At this point, positioning of the radar calibration auxiliary device is completed.

In the third step of calibrating the on-board radar, based on different radar calibration requirements, different radar calibration auxiliary devices may be mounted on the sliding member 30 to calibrate the on-board radar of the to-be-calibrated automobile 800.

It can be understood that, in some other embodiments, vertical plane calibration may be performed on the radar calibration auxiliary device 200 and the plate 302 by using a vertical plane calibration apparatus in the prior art, so that the radar calibration auxiliary device 200 and the plate 302 are perpendicular to the central axis plane of the automobile. The radar calibration auxiliary device 200 and the calibration laser 500 move to the front of the on-board radar, and the laser beam emitted by the calibration laser 500 passes through the through hole 202 of the radar calibration auxiliary device 200, thereby implementing positioning of the radar calibration auxiliary device. A person skilled in the art should understand that if vertical plane calibration is performed on the radar calibration auxiliary device 200 and the plate 302 by using the vertical plane calibration apparatus in the prior art, the radar calibration auxiliary device 200 is not required to reflect a light beam. Therefore, the radar calibration auxiliary device 200 does not need a light reflecting surface, and only needs to be in a panel shape and has the through hole 202. The radar calibration auxiliary device 200 may be a plastic panel, an aluminum panel, or the like.

In this embodiment, the calibration laser 500 is mounted on the second surface 3024, and the calibration laser 500 is wholly or partially accommodated in the mounting through hole 3026, so that the calibration laser 500 can horizontally slide in synchronization with the sliding member 30, thereby facilitating positioning of radar calibration auxiliary devices of different automobile models to calibrate on-board radars of different automobile models.

In addition, the calibration of the vertical plane of the radar calibration auxiliary device 200 and the plate 302 may be implemented by using the radar calibration auxiliary device 200, the diaphragm 300, and the on-board laser 400. The radar calibration auxiliary device 200 may be used for both the calibration of the vertical plane and positioning of the radar calibration auxiliary device. In this way, a quantity of elements of the on-board radar calibration device 600 is reduced, costs are reduced, and a calibration operation is simplified.

In addition, the sliding member 30 for mounting the radar calibration auxiliary device can slide horizontally along the guide rail 212. When there are a plurality of on-board radars in an automobile, after calibration of one on-board radar is completed, the sliding member 30 may slide to the front of another on-board radar to perform a calibration operation on the another on-board radar. Therefore, horizontal calibration does not need to be performed on the guide rail 212, thereby facilitating calibration of the plurality of on-board radars of the automobile.

It should be finally noted that the above embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although the present invention is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:

1. An on-board radar calibration device, comprising:
a bracket assembly;
a beam assembly mounted on the bracket assembly, the beam assembly being movable relative to the bracket assembly in a vertical direction;
a sliding member mounted on the beam assembly, the sliding member being movable relative to the beam assembly in a horizontal direction, the sliding member comprising a first surface and a second surface opposite to the first surface, the sliding member being provided with a first through hole, and the first through hole penetrating the first surface and the second surface;
a calibration laser accommodated in the first through hole and configured to emit a laser beam toward a to-be-calibrated automobile; and
a radar calibration auxiliary device mounted on the sliding member, the radar calibration auxiliary device being movable relative to the beam assembly together with the sliding member in a horizontal direction, and the radar calibration auxiliary device comprising a second through hole;
the calibration laser being configured to emit the laser beam to pass through the second through hole, to position the radar calibration auxiliary device;
wherein the calibration laser is configured to emit the laser beam to an on-board radar of the to-be-calibrated automobile by adjusting a position of the sliding member relative to the bracket assembly, to position the radar calibration auxiliary device, so that the radar calibration auxiliary device is positioned to a preset position relative to the on-board radar;
wherein the calibration laser is configured to emit the laser beam to a preset position on a surface of the on-board radar facing the on-board radar, calibration device;
wherein the on-board radar calibration device further comprises an auxiliary positioning apparatus configured to assist the calibration laser in emitting the laser beam to the preset position on the surface of the on-board radar facing the on-board radar calibration device,
wherein the auxiliary positioning apparatus is detachably attached on the surface of the vehicle-mounted radar.

2. The on-board radar calibration device according to claim 1, wherein an identifier of the preset position is provided on the auxiliary positioning apparatus.

3. The on-board radar calibration device according to claim 1, wherein the calibration laser is configured to emit the laser beam to the on-board radar of the to-be-calibrated automobile, so that the laser beam is reflected by the on-board radar to the preset position on the radar calibration auxiliary device.

4. The on-board radar calibration device according to claim 1, wherein the calibration laser is located at a central portion of the sliding member, so that the laser beam emitted by the calibration laser passes through a center point of the sliding member.

5. The on-board radar calibration device, comprising:
a bracket assembly;
a beam assembly mounted on the bracket assembly, the beam assembly being movable relative to the bracket assembly in a vertical direction;
a sliding member mounted on the beam assembly, the sliding member being movable relative to the beam assembly in a horizontal direction, the sliding member comprising a first surface and a second surface opposite to the first surface, the sliding member being provided with a first through hole, and the first through hole penetrating the first surface and the second surface; and
a calibration laser accommodated in the first through hole and configured to emit a laser beam toward a to-be-calibrated automobile, wherein the beam assembly comprises a guide rail, the guide rail being mounted on the bracket assembly, being horizontally disposed, and being movable relative to the bracket assembly in a vertical direction;
wherein the sliding member is movably mounted on the guide rail and is horizontally slidable along the guide rail.

6. The on-board radar calibration device according to claim 5, wherein the sliding member comprises a plate and a holding member;
the plate comprising the first surface and the second surface; and
the holding member being fixedly mounted on the plate and being movably mounted on the guide rail, so that the sliding member is horizontally slidable along the guide rail.

7. The on-board radar calibration device according to claim 6, wherein the beam assembly comprises two guide rails, the two guide rails being respectively mounted on the bracket assembly and being disposed parallel to each other in a horizontal direction at an interval of a preset distance;
wherein the sliding member comprises four holding members, each of the holding members being provided with an accommodating channel, and the accommodating channel being horizontally disposed;
wherein two accommodating channels of two holding members are arranged side by side along a first horizontal line, and two accommodating channels of the other two holding members are arranged side by side along a second horizontal line, one of the guide rails being sleeved on the two accommodating channels arranged side by side along the first horizontal line, and the other guide rail being sleeved on the other two accommodating channels arranged side by side along the second horizontal line.

8. The on-board radar calibration device, comprising:
a bracket assembly;
a beam assembly mounted on the bracket assembly, the beam assembly b movable relative to the bracket assembly in a vertical direction;
a sliding member mounted on the beam assembly, the sliding member being movable relative to the beam assembly in a horizontal direction, the sliding member comprising a first surface and a second surface opposite to the first surface, the sliding member being provided with a first through hole, and the first through hole penetrating the first surface and the second surface; and
a calibration laser accommodated in the first through hole and configured to emit a laser beam toward a to-be-calibrated automobile, wherein the bracket assembly comprises a lifting screw;
the lifting screw being disposed in a vertical direction;
wherein the beam assembly is sleeved on the lifting screw and is threadably fitted with the lifting screw, when the lifting screw rotates around a central axis of the lifting screw, the lifting screw driving the beam assembly to move along the lifting screw in a vertical direction.

9. The on-board radar calibration device according to any of claim 8, wherein the bracket assembly comprises a height gauge disposed in a vertical direction and configured to measure a moving distance of the beam assembly in a vertical direction.

10. The on-board radar calibration device according to claim 8, wherein the beam assembly comprises a support member and a guide rail;
   wherein the support member comprises a support body and a movable block;
   the movable block being fixedly mounted on the support body and sleeved on the lifting screw, and being threadably fitted with the lifting screw;
   wherein the guide rail is fixedly mounted on the support body in a horizontal direction.

11. The on-board radar calibration device according to claim 10, wherein the bracket assembly comprises a vertical bar disposed in a vertical direction;
   wherein the support member comprises a sliding block, the sliding block being fixedly mounted on the support body, the sliding block being movably mounted on the vertical bar, the sliding block being slidable along the vertical bar.

12. The on-board radar calibration device according to claim 10, wherein two clamping portions respectively extend from two opposite sides of the support body, the two clamping portions being elongated, being disposed in a horizontal direction, and being spaced apart by a preset distance;
   wherein two guide rails are respectively mounted on the two clamping portions, the two guide rails being disposed in a horizontal direction, the two guide rails being spaced apart by a preset distance.

13. The on-board radar calibration device according to claim 10, further comprising a clamping portion attached to the support body and configured to support the guide rail.

14. The on-board radar calibration device according to claim 1, wherein the beam assembly comprises a gradienter configured to detect whether the beam assembly is horizontally disposed.

15. The on-board radar calibration device according to claim 1, wherein the calibration laser is movably mounted in the sliding member.

* * * * *